United States Patent [19]

Langecker

[11] Patent Number: 4,563,147
[45] Date of Patent: Jan. 7, 1986

[54] APPARATUS FOR EXTRUDING A TUBE

[75] Inventor: Günter R. Langecker, Meinerzhagen, Fed. Rep. of Germany

[73] Assignee: Battenfeld Maschinenfabrik GmbH, Meinerzhagen, Fed. Rep. of Germany

[21] Appl. No.: 483,361

[22] Filed: Apr. 8, 1983

Related U.S. Application Data

[63] Continuation of Ser. No. 294,036, Aug. 18, 1981, abandoned.

[30] Foreign Application Priority Data

Aug. 20, 1980 [DE] Fed. Rep. of Germany ....... 3031333

[51] Int. Cl.$^4$ ............................................. B29D 23/04
[52] U.S. Cl. ............................. 425/376 A; 264/40.5; 264/541; 264/209.2; 264/209.8; 425/141; 425/146; 425/149; 425/166; 425/532; 425/381; 425/466; 425/467
[58] Field of Search ................. 264/209.8, 209.2, 541, 264/40.1, 40.5; 425/466, 376 A, 467, 167, 381, 532, 140, 149, 141, 150, 146, 166

[56] References Cited

U.S. PATENT DOCUMENTS

| | | | |
|---|---|---|---|
| 3,032,819 | 5/1962 | Gasmire | 425/166 |
| 3,147,515 | 9/1964 | Amsden | 425/381 |
| 3,209,404 | 10/1965 | Hagen | 425/466 |
| 3,538,548 | 11/1970 | Tenner | 425/146 |
| 3,690,798 | 9/1972 | Raspante | 425/167 |
| 3,698,846 | 10/1972 | Leutner | 425/150 |
| 3,865,528 | 2/1975 | Roess | 425/166 |
| 4,038,017 | 7/1977 | Langecker | 425/466 |
| 4,063,865 | 12/1977 | Becker | 425/467 |
| 4,179,251 | 12/1979 | Hess et al. | 425/512 |
| 4,279,857 | 7/1981 | Feuerherm | 264/541 |

FOREIGN PATENT DOCUMENTS

| | | | |
|---|---|---|---|
| 2100192 | 7/1972 | Fed. Rep. of Germany . | |
| 2510127 | 9/1976 | Fed. Rep. of Germany | 425/466 |
| 2533077 | 2/1977 | Fed. Rep. of Germany | 425/140 |
| 2654001 | 6/1978 | Fed. Rep. of Germany | 425/381 |
| 56-77119 | 6/1981 | Japan | 425/141 |
| 56-77120 | 6/1981 | Japan | 425/141 |

Primary Examiner—Jeffery Thurlow
Attorney, Agent, or Firm—Karl F. Ross; Herbert Dubno

[57] ABSTRACT

A machine has a nozzle formed with an annular passage centered on an axis and having at an outer axial end an annular mouth. A plastic mass is introduced under pressure into the inner axial end of the passage at two diametrally opposite locations and mixes and passes outwardly along the passage to emerge from the mouth as a tube. The axial outward flow of the mass along the passage is impeded upstream of the mouth to pressurize the mass with a pressure substantially greater than atmospheric. Such flow is impeded either by restricting the passage or by allowing the volume of the passage to increase against a predetermined counterforce. The mass will form when it leaves the nozzle a tube of almost perfectly uniform wall thickness.

1 Claim, 6 Drawing Figures

APPARATUS FOR EXTRUDING A TUBE

CROSS-REFERENCE TO RELATED APPLICATION

This application is a continuation of application Ser. No. 294,036 filed Aug. 18, 1981 and now abandoned.

FIELD OF THE INVENTION

The present invention relates to an apparatus for extruding a tube and to a method of operating this apparatus. More particularly this invention concerns such a method and apparatus used for making a thin-walled tube of a high molecular-weight synthetic resin for subsequent blow molding, as into bags.

BACKGROUND OF THE INVENTION

It is standard practice, as for example known from German patent publication Nos. 2,100,192 and 2,510,127 filed Jan. 4, 1971 and Mar. 6, 1975 by A. Godtner and E. Langecker respectively, to form a thermoplastic resin, such as polyethylene, into a thin-wall tube by injecting the resin at a plurality of angularly equispaced locations into the inner end of a tubular extrusion passage of a ring nozzle. As the still plastic mass moves axially outward along the passage the flows merge and mix, to emerge at the downstream end or mouth of the passage as a unitary tube.

In these arrangements considerable attention is devoted to ensuring that the extruded tube is of uniform wall thickness. Thus various mechanical contrivances are incorporated into the nozzle head to adjust the shape of the passage with an aim to achieving such uniform wall thickness. Even in the best of these systems, however, the wall thickness varies somewhat. The too-thick portions therefore do not expand properly when later processed, leading to failure of the to thin portions.

German patent document No. 2,654,001 filed Nov. 27, 1976 by H. Feuerherm describes both a method and an apparatus of the above-described general type aimed mainly at producing a tube whose wall thickness is uniform. This is accomplished by providing a radially deformable ring that forms an outer wall of the nozzle passage. Various mechanical expedients allow this ring to be deformed so as to vary the passage thickness. Empirically the user of the machine makes various adjustments until reasonably uniform wall thickness is achieved.

The problem with this arrangement is that a setting that is empirically derived for one resin mix will normally have to be changed for another. Furthermore the adjustable nozzle is an extremely expensive and complex piece of equipment which is prone to breakdown.

OBJECTS OF THE INVENTION

It is therefore an object of the present invention to provide an improved apparatus for extruding a tube.

Another object is to provide an improved method of operating such an apparatus.

A further object is the provision of such an apparatus and method which allow the production of a tube of uniform wall thickness.

SUMMARY OF THE INVENTION

These objects are attained according to the instant invention in a method of operating a machine having a nozzle formed with an annular passage centered on an axis and having at an outer axial end an annular mouth and wherein a plastic mass is introduced under pressure into the inner axial end of the passage at two diametrally opposite locations and mixes and passes outwardly along the passage to emerge from the mouth as a tube. The improvement according to the instant invention comprises the step of impeding axial outward flow of the mass along the passage upstream of the mouth to pressurize the mass with a pressure substantially greater than atmospheric.

The invention is based on the fact that synthetic resins of high molecular weight, such as polyethylene, normally swell as they leave the extruder and enter the nozzle passage, due to the normally occurring stresses in such resins. These stresses are in turn determined for a given polymer by the deformation layers and the relaxation of working. As a result the extruded tube can swell or change in thickness as well as in diameter as it leaves the passage. This dimensional change is particularly difficult to compensate for with the prior-art systems, but the system of this invention allows it to be completely canceled out.

In fact the system of the instant invention allows a tube to be formed of perfectly uniform wall thickness without the necessity of providing complex mechanisms in the nozzle. Instead the back pressure according to this invention causes the various streams of the plastic mass introduced at the upstream end of the nozzle passage to merge and overlap each other, all while remaining under sufficient pressure that there is no difference in swelling from one part to the other. This results in different swelling of the parts of the tube as it emerges from the nozzle.

The two streams of plastic mass are of sickle-shaped cross section when the back pressure is relatively low, and are slightly eccentric tubes lying one within the other when the back pressure is higher. This is in accordance with another feature of this invention, that the mass is fed into the inner passage end as two separate and coaxial tubular flows that merge at the inner end and the flow of this mass along the passage upstream of its mouth is impeded by resisting it with an axially oppositely effective counterforce. This avoids the problem with the prior-art systems where the material is not opposed in the nozzle appreciably and the resultant tube is of circular inner section but oval outer section, with the thickest portions corresponding to the regions where the two flows overlap.

According to another feature of this invention the opposing force is varied as the mass is extruded from the nozzle.

In addition the apparatus according to the instant invention further has an outer nozzle tube having an inner surface, an inner nozzle tube coaxially within the outer nozzle tube and having an outer surface radially confronting the inner surface and forming therewith the passage, a sleeve piston displaceable between the inner and outer tubes between an outer position greatly reducing the volume of the passage and an inner position generally out of the passage, and means including a hydraulic cylinder connected to the sleeve piston for displacing same axially outwardly relative to the inner and outer tubes toward the outer position. When the back pressure is varied, it is possible to extrude a tube of increasing or decreasing wall thickness, as is useful in many blowing operations. For instance a tube suitable for blow-molding into a bottle can easily be extruded with such a procedure. The system of this invention can be used for continuous and discontinuous extrusion of the tube.

According to yet another feature of this invention, the flow of the mass along the passage is impeded by pressurizing the cylinder with a pressure substantially greater than atmospheric to urge the piston forwardly into its outer position. It is also possible to impede the flow of the mass along the passage by restricting the flow cross section of the passage. This flow cross section is restricted to a size substantially smaller than the flow cross section of the passage at the outer end.

More particularly the apparatus according to the instant invention has a nozzle having an outer nozzle tube having an inner surface and centered on an axis, and an inner nozzle tube coaxially within the outer tube and having an outer surface radially confronting the inner surface and forming therewith an annular passage having an axial inner end and an axial outer end. The apparatus further has means for feeding a plastic mass under pressure to this inner end at a plurality of angularly equispaced locations therein so that the mass moves axially outwardly along the passage and emerges from its outer end as a tube, and means for impeding axially outward flow of the mass along the passage upstream of the outer end to pressurize the mass in the passage with a pressure substantially greater than atmospheric. This means for impeding can include a sleeve piston displaceable between the inner and outer tubes between an inner position generally out of the passage and an outer position in and greatly reducing the volume of the passage, and means including a pressurizable chamber for urging this piston into its outer position. Such structure can be easily retrofitted on a prior-art tube-extrusion machine.

According to this invention, the means including a chamber includes a source of a fluid under pressure having a high-pressure side and a low-pressure side, valve means connected to both of the sides, at least one fluid line connected between this valve means and the chamber, and at least one flow restriction in this fluid line. The system may further comprise a check valve in parallel to this flow restriction and permitting flow through its line toward the chamber.

The apparatus according to the instant invention can, according to a further feature of this invention, comprise a restriction in the passage upstream of its outer end reducing the flow cross section of the passage to a size smaller than that of the passage at its outer end. This passage may be formed to either side of this restriction with regions of greater flow cross section than at the restriction.

Such an apparatus may comprise according to yet another feature of this invention an inner adjustment tube concentrically inside the inner nozzle tube and having an axially tapered or frustoconical end surface exposed in the passage and forming the restriction, and means for axially displacing this inner adjustment tube in the nozzle and thereby varying the flow cross section at the restriction. A core rod concentrically within the tubes and having an outer surface downstream of this end surface of the adjustment tube forms the inner surface of the passage downstream of the end surface. In this case the adjustment tube is axially slidable on this rod. Furthermore the passage has at the rod and downstream of this restriction a region of flow cross section greater than that of the passage upstream of the restriction.

DESCRIPTION OF THE DRAWING

The above and other features and advantages will become more readily apparent from the following, reference being made to the accompanying drawing in which.

SPECIFIC DESCRIPTION

Figure 1:
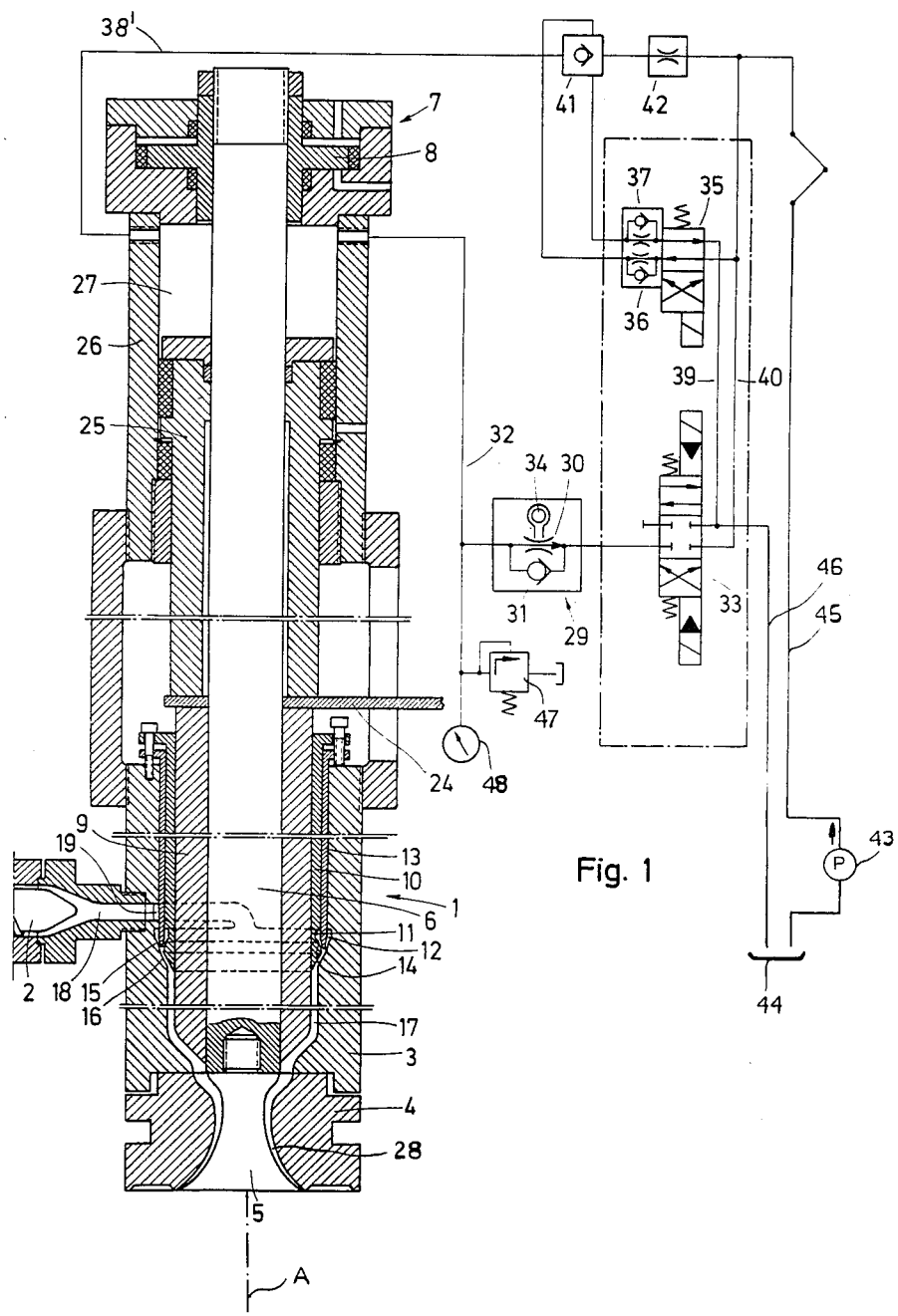
FIG. 1 is a largely schematic view of the apparatus according to the present invention.

As seen in FIG. 1 a nozzle 1 is connected to an extruder 2 and basically has an outer nozzle tube 3 carrying a nozzle ring 4 of hyperboloidal inner shape receiving a core 5 of generally complementary outer shape. A core rod 6 centered on an axis A has a lower end carrying this core 5 and an upper end received in a cylinder 7 and formed with a piston 8 that can move limitedly axially to vary the flow cross section of a downstream passage section 28.

In addition the nozzle 1 has an inner tube 9 closely surrounding the core rod 6 and limitedly axially displaceable therealong. Snugly surrounding this tube 9 is an inner sleeve 10 formed adjacent its lower end with an outwardly open circumferential groove 11. The fixed outer tube 3 is formed in line with this groove 11 with an inwardly open circumferential groove 12, and an outer sleeve 13 snugly received between the tube 3 and the sleeve 10 has a lower end extending down slightly past these grooves 11 and 12. This lower end forms a gap 14 with the inner sleeve 10 and a gap 15 with the outer tube 3, with these gaps 14 and 15 together feeding into an upper passage section 16 joined by an intermediate passage section 17 to the lower or outer passage section 28.

Figure 5:
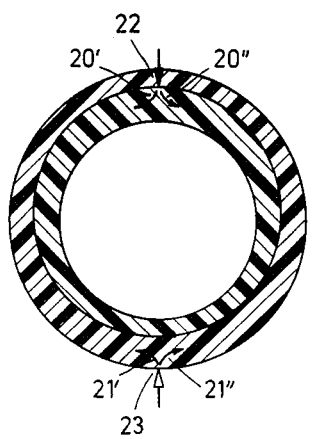
FIGS. 5 and 6 are views similar to FIGS. 3 and 4, respectively, showing the tube of this invention.
Figure 6:
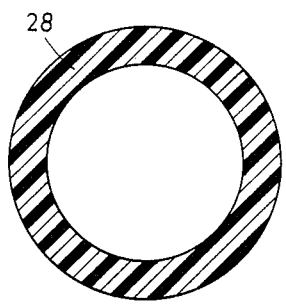

The extruder 2 has an outlet passage 18 that opens into an inlet passage 19 of the nozzle 1 that in turn opens at two diametrally opposite locations 22 and 23 respectively opening at the groove 12 and the groove 11 as shown in FIGS. 5 and 6. Thus part of the plastic mass injected by the extruder 2 into the nozzle 1 is injected as a stream 20, 20' that splits and flows around the outside of the intermediate sleeve 13 and the other part as a stream 21, 21' that splits and flows around the inside of the sleeve 13. The two streams join in the region 16 of the passage.

Figure 3:
FIGS. 3 and 4 are cross sections through prior-art tubes both before and after extrusion.
Figure 4:
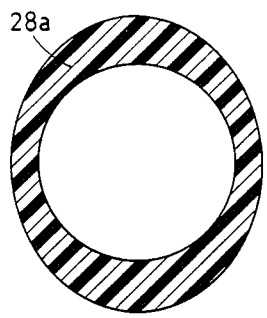

In the prior-art system as illustrated in FIGS. 3 and 4 the material is injected at one diametral outside location 22a and at an opposite location 23a so as to split into two streams 20a', 20a" and 21a', 21a" that fit within each other and are of sickle-shaped cross section. The result of such feeding according to the prior art is a body 28a shown in FIG. 4 which has a round inner wall and an oval outer wall, with obviously nonuniform wall thickness.

On the contrary the system according to the instant invention, because of the above-described style of feeding and for other reasons described below, will be of uniform wall thickness as shown at 28 in FIG. 6.

The inner tube 9 which forms the inner surface of the portion 17 of the nozzle passage has a rear end formed as a piston 25 received in a cylinder 26 forming with the piston 25 a chamber 27. This chamber 27 can be pressurized via a line 32 from a pump 43 which can draw hydraulic liquid from an unpressurized sump 44 and feed it at high pressure to a high-pressure line 45, with the liquid returning to the sump 44 via a return line 46. The line 32 is provided with a pressure-limiting valve 47 and a pressure gauge 48.

Interposed in the line 32 between the pump 43 and the chamber is a flow-limiting valve 29 and a four-port three-position control slide valve 33. The limiting valve 29 is formed of a restriction 30 whose flow cross section can be varied by a servomotor 34 and of a check valve 31 parallel to the restriction 30 and oriented to bypass the restriction 30 for flow into the chamber 27. The control valve 33 in the center position into which it is urged when neither of its solenoids is actuated blocks flow into or out of the chamber 27 via the line 32. In the one end position the line 32 is connected to the return line 46 and in the other end position to the high-pressure line 45.

In addition the chamber 27 can be pressurized via a line 38 connected through a changeover valve 41 and a restriction 42 to the high-pressure line 45. A four-port two-position reversing slide valve 35 is connected via respective restriction check valves 36 and 37 to the control ports of the changeover valve 41 and is normally operated with the valve 33. This structure ensures that the cylinder 27 will be pressurized uniformly and smoothly when the inner tube 9 is being advanced to push a charge of plastified synthetic resin out of the nozzle 1.

In use the resin is introduced into the nozzle 1 under considerably pressure, but the restriction 30 is adjusted to maintain a back pressure of about 100 bar in the chamber 27. As the material enters the nozzle under considerably higher pressure, therefore, the tube 9 is driven back. Once all the way back the valves 33 and 35 raise the pressure in the chamber to 250 bar–300 bar to force out the mass in the passage 17. The cycle is then repeated. End switches acted on by an arm 24 carried on the inner tube 9 control such cycling.

Figure 2:
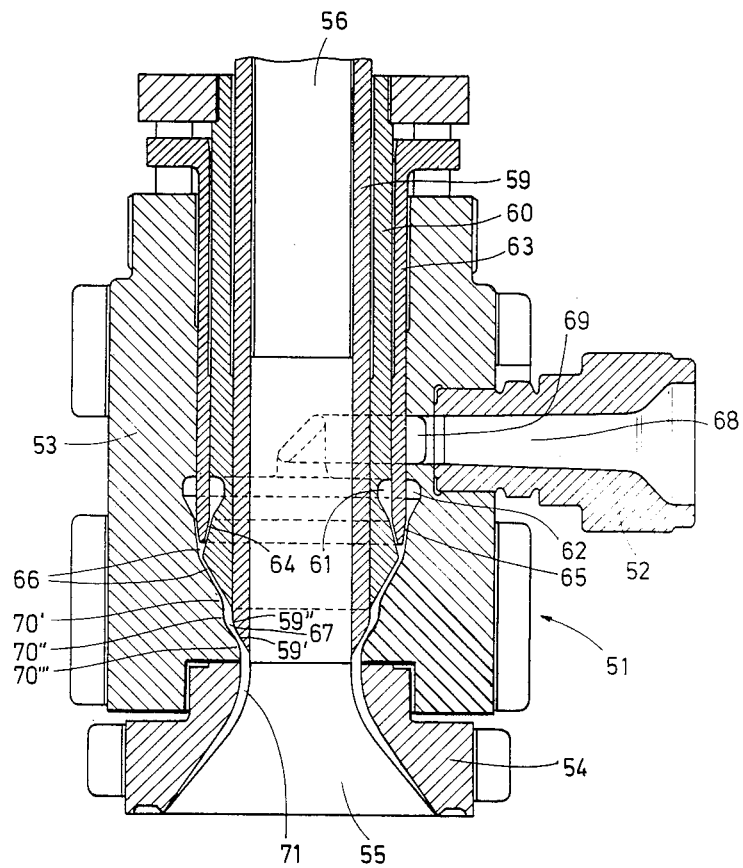
FIG. 2 is a large-scale axial section through a detail of another nozzle according to this invention.

FIG. 2 shows another arrangement having a nozzle 51 provided with an axially displaceable inner tube or control member 59 which surrounds the core rod 56. This member 59 is itself surrounded by a sleeve 60 functionally identical to the sleeve 10 of FIG. 1. To this end the sleeve 60 has at its lower end a circumferential groove 61 level with a further such groove 62 of the outer tube 53. An intermediate sleeve 63 extends down between the tube 53 and sleeve 60 to come between the two grooves 61 and 62 and form respective gaps or passage sections 64 and 65 that join at a passage 66.

This passage or restriction gap 66 is limited on the inside by the outer frustoconical surface of the sleeve 60 and on the outside by the surface of the outer tube 53. The member 59 has at its lower end a frustoconical surface 59' which is connected over a convex connection surface 59" with the cylindrical outer surface of the member 59.

Thus axial shifting of the sleeve 60 allows one to vary the flow cross section of the passage section 66. Such restricting of the passage here takes the place of hydraulically biasing the tube 9 as in FIG. 1.

The mouth or outlet end of the extruder 52 communicates with a semicircular passage 69 whose one end opens into the groove 61 while its diametrally opposite end opens into the groove 62. As the melt is forced into the nozzle 51 from the extruder 52 it forms two separate streams which enter as shown in FIG. 5 at two separate locations 22 and 23, with the same mixing as described above with reference to the arrangement of FIG. 1. The considerable back pressure that can be created with the system of FIG. 2 by forward displcement of tube 59 to restrict the passage at 67 ensures that a tube of uniform wall thickness will be formed.

It is important that the passage 66 at the gap 67 is of undulating or varying flow cross section. The shape of the ends of the tube 59 and sleeve 60 make two narrow regions 70' and 70" flanking a wide region 70'''. At least the regions 70" and 70''' are adjustable by displacement of the tube 59. In addition the nozzle passage has downstream of the regions 70'-70''' a relatively wide region 71 whose flow cross section is at least as great as the largest upstream passage part. Thus when the pressure upstream is around 150 bar, the pressure in this region 71 will be about 80 bar–100 bar.

The system according to the instant invention therefore allows a tube of almost perfectly uniform wall thickness to be extruded without the use of complex mechanism or operating procedures. The synthetic-resin mass, normally a high molecular weight thermoplastic like polyethylene, is maintained under pressure in the nozzle until it has been formed into the tube, either by providing a restriction in the nozzle passage or by allowing the nozzle passage to expand in volume against a predetermined relatively high force. Only once the resin has been formed into a tube is it released from the nozzle, so that, if it swells, it will swell uniformly, making the tube of uniform wall thickness.

I claim:

1. An apparatus comprising:
   a nozzle having
      an outer nozzle element having an inner surface and centered on an axis, and
      an inner nozzle element coaxially within the outer element and having an outer surface radially confronting the inner surface and forming therewith an annular passage having an axial inner end and an axial outer end;
   means for feeding a plastic mass under pressure to the inner end at a plurality of angularly equispaced locations therein, whereby the mass moves axially outward along the passage and emerges from the outer end as a tube;
   means including a flow restriction at the outer end for impeding flow of the mass out of the passage to maintain the mass in the passage at least at a predetermined intermediate pressure;
   a sleeve piston displaceable between the inner and outer elements between an inner position generally out of the passage and an outer position in and greatly reducing the volume of the passage; and
   means including
      a pressurizable chamber;
      a source of a fluid under pressure having a high-pressure side and a low-pressure side;
      valve means connected to both of the sides;
      at least one fluid line connected between the valve means and the chamber;
      at least one flow restriction in the fluid line; and
      a check valve in parallel to the flow restriction and permitting flow through the line toward the chamber
   for urging the piston into the outer position and for alternately pressurizing the chamber with a relatively low pressure below the intermediate pressure and with a relatively high pressure above the intermediate pressure, whereby the sleeve piston reciprocates in the passage synchronously with the pressure alternations.

\* \* \* \* \*